United States Patent
Powell et al.

(10) Patent No.: US 9,428,337 B1
(45) Date of Patent: Aug. 30, 2016

(54) SYSTEM, APPARATUS, AND METHOD OF HANDLING, STORING AND MANAGING GARMENTS

(71) Applicant: ORIGARBI, LLC, Alexandria, VA (US)

(72) Inventors: Matthew Powell, Alexandria, VA (US); Andrew P. Brosky, Waldorf, MD (US); Charles Hebert, Waldorf, MD (US)

(73) Assignee: Threadrobe, Inc., Wilmington, DE (US)

( * ) Notice: Subject to any disclaimer, the term of this patent is extended or adjusted under 35 U.S.C. 154(b) by 0 days.

(21) Appl. No.: 14/918,074

(22) Filed: Oct. 20, 2015

(51) Int. Cl.
| | |
|---|---|
| *G06F 7/00* | (2006.01) |
| *G06F 19/00* | (2011.01) |
| *B65G 1/04* | (2006.01) |
| *B65G 1/137* | (2006.01) |
| *B25J 15/00* | (2006.01) |
| *F16M 13/02* | (2006.01) |
| *D06F 73/02* | (2006.01) |

(52) U.S. Cl.
CPC ......... *B65G 1/0457* (2013.01); *B25J 15/0028* (2013.01); *B65G 1/1371* (2013.01); *D06F 73/02* (2013.01); *F16M 13/02* (2013.01)

(58) Field of Classification Search
None
See application file for complete search history.

(56) References Cited

U.S. PATENT DOCUMENTS

| | | | |
|---|---|---|---|
| 5,509,572 A | * | 4/1996 | Curtis ............... G07F 7/00 198/411 |
| 7,876,220 B2 | | 1/2011 | Aldridge |
| 7,971,777 B2 | * | 7/2011 | Ha ............... D06F 58/10 235/375 |
| 8,820,594 B2 | | 9/2014 | Sakane et al. |
| 2007/0021283 A1 | | 1/2007 | Leifer et al. |
| 2008/0120167 A1 | | 5/2008 | Guenster et al. |
| 2008/0126962 A1 | | 5/2008 | Cook |
| 2010/0191770 A1 | | 7/2010 | Cho et al. |
| 2015/0026084 A1 | | 1/2015 | Guo et al. |

FOREIGN PATENT DOCUMENTS

| | | |
|---|---|---|
| CN | 20148863 U | 4/2010 |
| CN | 103246810 A | 8/2013 |

* cited by examiner

*Primary Examiner* — Yolanda Cumbess
(74) *Attorney, Agent, or Firm* — Maier & Maier, PLLC

(57) ABSTRACT

According to a further exemplary embodiment, a wardrobe may be provided. The wardrobe may include a receiving element located in a housing that may be configured to receive and dispense clothing items. Each clothing item may include a unique RFID tag and a number of RFID readers may be connected to a computing means configured to obtain information held in each RFID tag. The wardrobe may further include a linear actuator proximate a top surface of the housing, the linear actuator may be controlled by the computing means. The linear actuator may be coupled to a gripper assembly on one end. Additionally, the wardrobe may include a number of hangers that may be disposed on one or more inner surfaces of the housing, each hanger may be configured to store one or more of the clothing items. A display screen may be embedded on the outer surface of the housing.

12 Claims, 11 Drawing Sheets

SYSTEM, APPARATUS, AND METHOD OF HANDLING, STORING AND MANAGING GARMENTS

BACKGROUND

Washing machines and dryers have been sold as consumer appliances for several decades, and are still the focus of significant research and development. Manufacturers strive to make them faster, use fewer resources, and be gentler with clothes. However, for a majority of people, the most unpopular part of doing laundry is not the washing or drying steps, but rather, folding and putting away clothes once they are clean and dry.

Putting away clothes is largely done by hand, as some garments may need to be paired, folded, or ironed in a specific way. An appliance that may pick, store, and identify clothes in an autonomous and convenient way would therefore be desirable. In addition, it would be extremely advantageous to have a device that may keep track of every piece of clothing in an electronic inventory and make it available for online managing and sharing.

SUMMARY

According to an exemplary embodiment, a wardrobe may be provided. The wardrobe may include a receiving element located in a housing that may be configured to receive and dispense clothing items. Each clothing item may include a unique RFID tag and a number of RFID readers may be connected to a computing means configured to obtain information held in each RFID tag. The wardrobe may further include a mounting platform proximate a top surface of the housing and a linear actuator coupled to the mounting platform. The mounting platform and the linear actuator may be controlled by the computing means. The linear actuator may be coupled to a gripper assembly on one end. Additionally, the wardrobe may include a number of hanger receivers that may be disposed on one or more inner surfaces of the housing, and each hanger receiver may be configured to store one or more of the clothing items. A display screen may be embedded on the outer surface of the housing and connected to the computing means. An information storage device may also be connected to the computing means.

According to another embodiment, a gripper assembly may be provided. The gripper assembly may include a first motor engaging a housing, and a second motor disposed within the housing. The second motor may be connected to a longitudinally translatable shaft. Further, a pivot rod may be rigidly connected to the shaft. A transferable hanger may be removably coupled to the pivot rod. The transferable hanger may include a pair of oppositely moving fingers each including a protrusion, and a biasing element which biases the oppositely moving fingers towards one another.

BRIEF DESCRIPTION OF THE DRAWINGS

Advantages of embodiments of the present invention may be apparent from the following detailed description of the exemplary embodiments. The following detailed description should be considered in conjunction with the accompanying Figures in which.

DETAILED DESCRIPTION

Aspects of the present invention are disclosed in the following description and related Figures directed to specific embodiments of the invention. Those skilled in the art may recognize that alternate embodiments may be devised without departing from the spirit or the scope of the claims. Additionally, well-known elements of exemplary embodiments of the invention may not be described in detail or may be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein may be performed by specific circuits (e.g., application specific integrated circuits (ASICs)) and/or by program instructions executed by at least one processor. Additionally, the sequence of actions described herein may be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
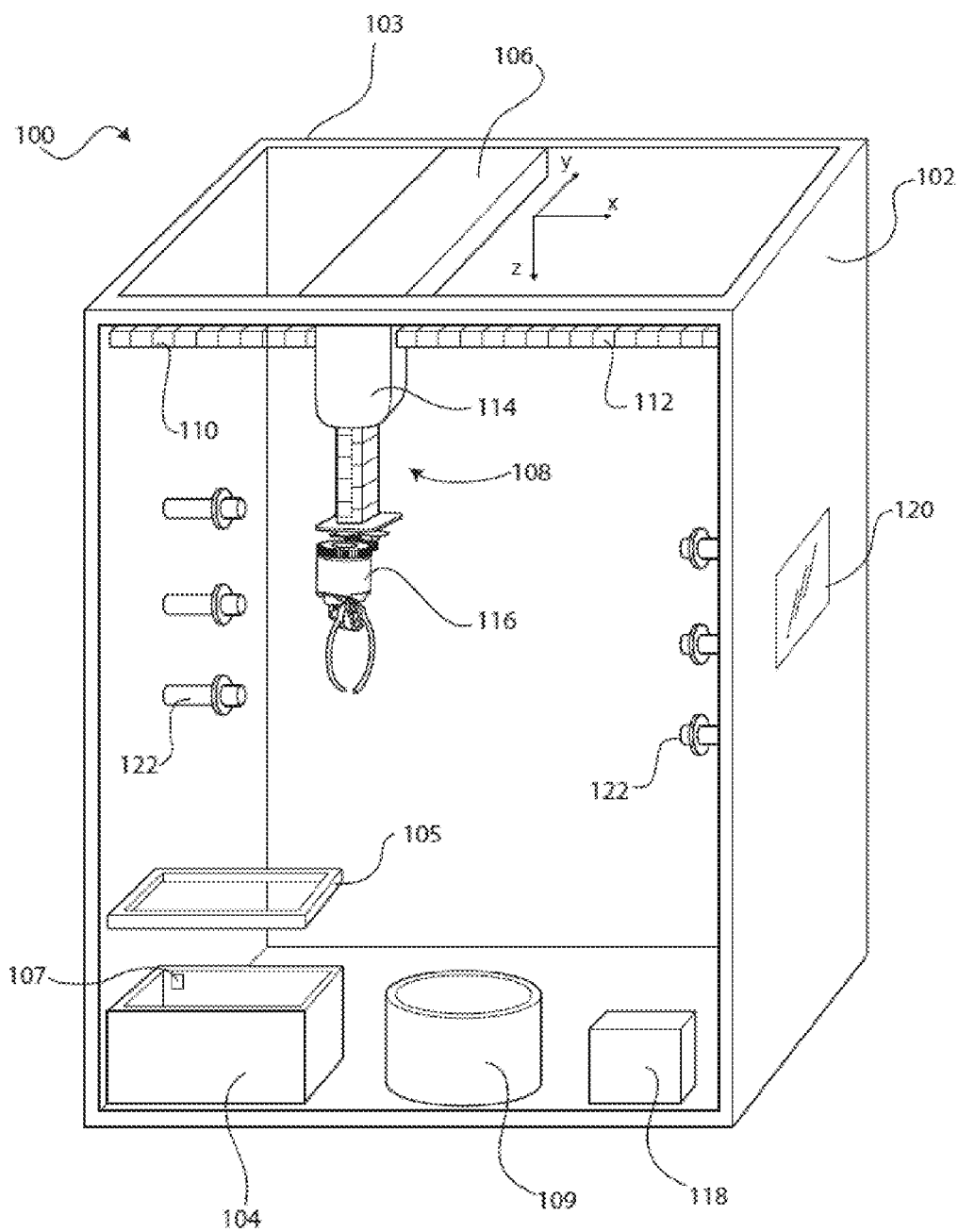
FIG. 1 may show an exemplary embodiment of a wardrobe.

In an exemplary embodiment illustrated in FIG. 1, a wardrobe 100 may be disclosed. The wardrobe 100 may include a housing 102 that may, for example, be configured to store a plurality of clothing items in an interior thereof. Wardrobe 100 may contain an accepting bin 104 which may be configured to accept a plurality of items, for example, a plurality of unsorted clothing items. In some exemplary embodiments, accepting bin 104 may be a tumbler, clothes dryer, drum, bowl, or the like, as would be understood by a person of ordinary skill in the art. Accepting bin 104 may include an RFID reader 105 coupled to a top thereof, and a plurality of sensors 107 on an interior thereof. In some exemplary embodiments, wardrobe 100 may further include a steamer 109 which may be configured, for example, to steam a plurality of clothing items. In other exemplary embodiments, accepting bin 104 may have steaming capabilities.

A mounting platform or motion stage 106 may be mounted in proximity to a top portion 103 of housing 102. The mounting platform 106 may be controlled to move along the interior of top portion 103 in both the X-direction and the Y-direction as shown in FIG. 1.

A linear actuator 108 may be coupled to the mounting platform 106 with at least one end extending down into the interior of wardrobe 100. As would be understood by a person of ordinary skill in the art, linear actuator 108 may be, for example, a belt, zipper, chain or the like, that may be moveable in the Z-direction as shown in FIG. 1. In one exemplary embodiment linear actuator 108 may be a pair of independent chains or belts 110, 112 which are parallel to top portion 103 on either side of a joining element 114. When independent chains 110, 112 pass through joining element 114, independent chains 110, 112 may be coupled to form, for example, a single rigid member which extends in the Z-direction below joining element 114 as shown in FIG. 1. As would be understood by a person of ordinary skill in the art, chains 110, 112 may be controlled such that linear actuator 108 can be raised or lowered anywhere in the Z-direction within the interior of wardrobe 100. In alternative embodiments, linear actuator 108 may be any similar device operable to achieve the functions described herein.

An end effector 116 may be coupled to linear actuator 108. End effector 116 may be for example, a gripper assembly as further described in FIG. 2. In alternative embodiments, end effector 116 may be another device chosen for a particular application. As would be understood by a person of ordinary skill in the art, movement of the mounting platform 106 in the X-direction and Y-direction, and linear actuator 108 in the Z-direction, may be controlled such that a location of the end effector 116 within wardrobe 100 may be precisely determined at any given time. End effector 116 may be configured to rotate about an axis substantially parallel to the Z-direction as would be understood by a person of ordinary skill in the art.

In some exemplary embodiments wardrobe 100 may include a controller 118. In some exemplary embodiments, controller may be a single board computer (SBC) 118. Alternatively, controller 118 may include a plurality of control boards within wardrobe 100 which may contain software configured to operate subsystems of wardrobe 100 as would be understood by a person of ordinary skill in the art. Controller 118 may be connected to a display screen 120 that can be used as a user's interface. Display screen 120 may be, for example, a tablet or the like having its own processor and data storage capabilities. Controller 118 and display screen 120 may be configured, for example, to control each of the operating systems, controls, software, subsystems and the like of wardrobe 100. Controller 118 may control the movement of mounting platform 106 in the X-direction and the Y-direction. Controller 118 may further control movement of the linear actuator in the Z-direction. Controller 118 may control the orientation of end effector 116 about an axis substantially parallel to the Z-direction. Additionally, controller 118 may communicate with RFID reader 105 and sensors 107 of accepting bin 104, which may assist in detecting one or more clothing items within accepting bin 104. It may be appreciated that the accepting bin 104 may be equipped with any desired number and type of sensors 107, including but not limited to light-sensitive sensors, pressure sensitive sensors, or the like as may be understood by a person having ordinary skill in the art.

Figure 3:
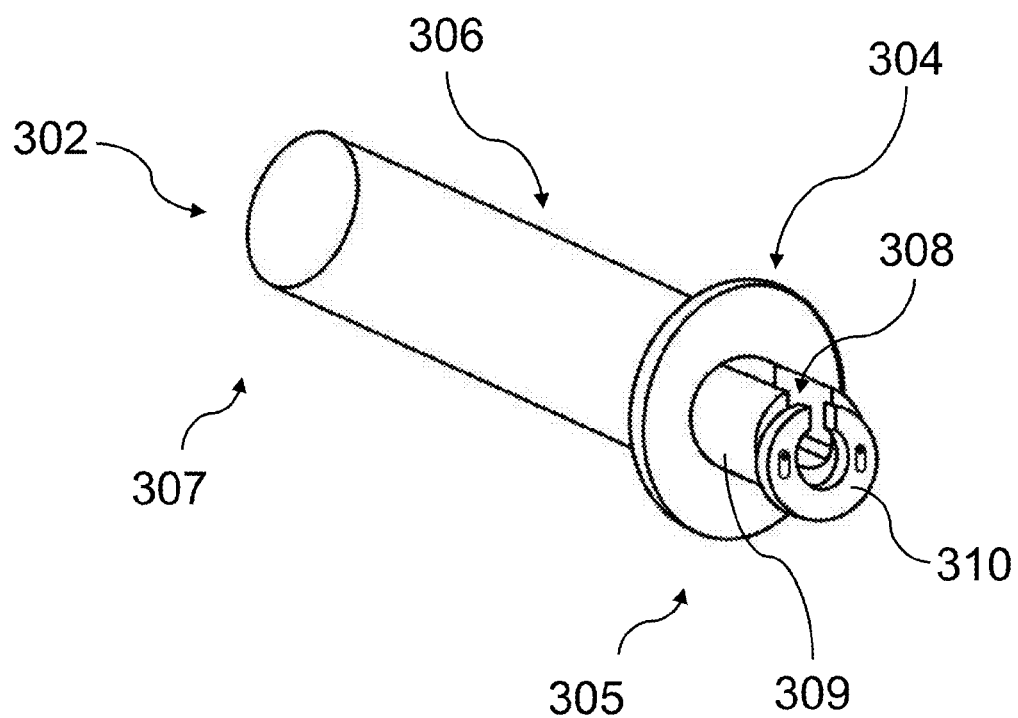
FIG. 3 may show an exemplary embodiment of a hanger receiver.

Still with reference to FIG. 1, housing 102 may have a plurality of hanger receivers 122. Hanger receivers 122 may be disposed on any interior surface of housing 102 and extend toward an interior thereof. Each of the plurality of hanger receivers 122 may be configured to interact with end effector 116 as described in more detail with respect to FIGS. 3 and 5A-B.

In a further exemplary embodiment, a wardrobe 100 may be described as a digital smart closet and may have stand-alone value in, for example, eliminating the manual fold and store process associated with doing laundry. Further, the wardrobe 100 may provide clothes steaming capabilities, and may assist the user in the digital cataloging of the user's wardrobe, and with selection of outfits. The wardrobe 100 may also optionally integrate a washer and dryer as well as additional features such as decorative lightings and displays for entertainment.

Figure 2:
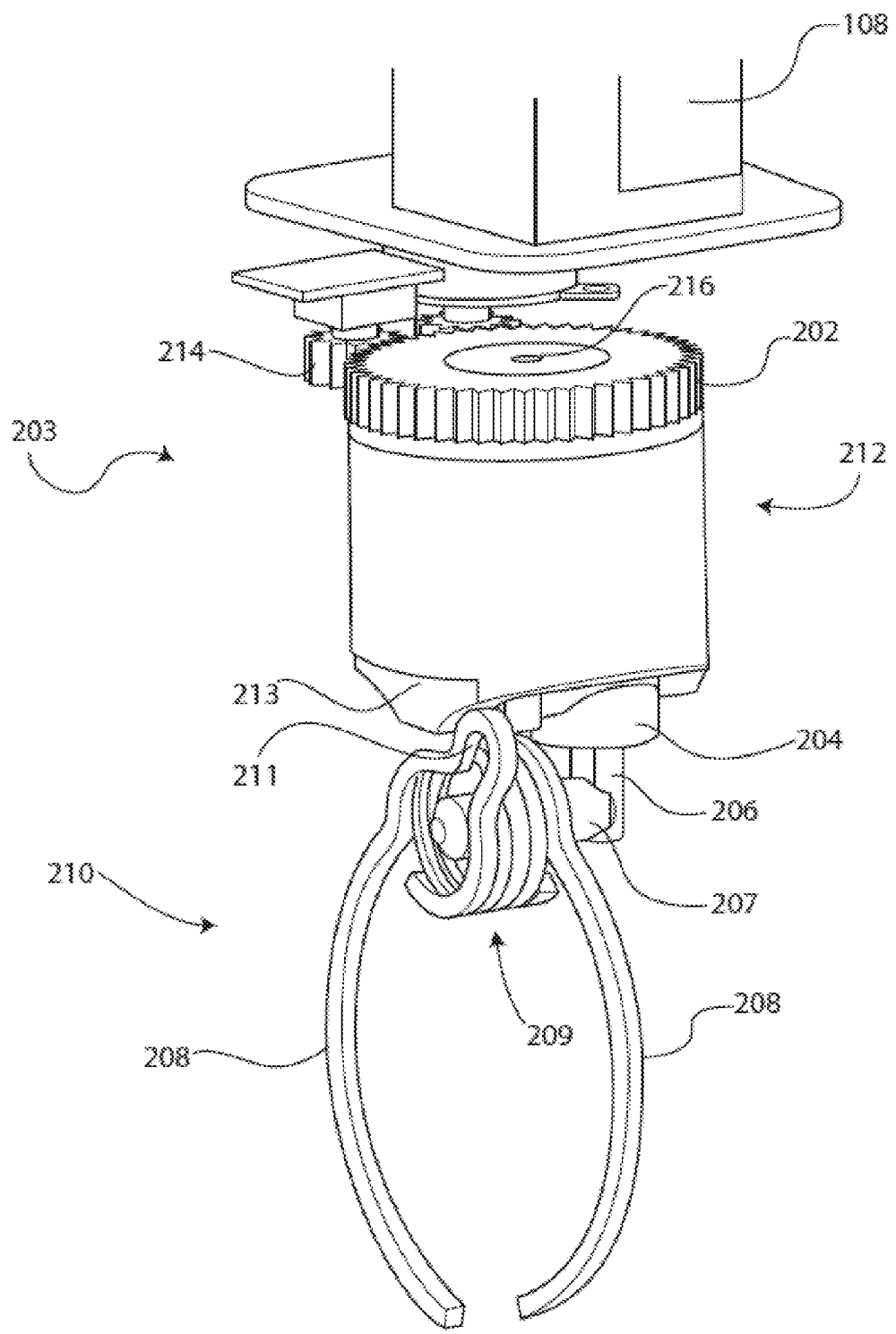
FIG. 2 may show an exemplary embodiment of a gripper assembly.

Turning now to FIG. 2, an exemplary gripper assembly 203 may be shown. Gripper assembly 203 may be a type of end effector 116 as described with reference to FIG. 1, and therefore may be coupled to linear actuator 108.

Gripper assembly 203 may include a first motor 204 at least partially disposed within a rotor housing 212. Rotor housing 212 may have one or more curved surfaces 213 on a bottom portion thereof. A longitudinally moving shaft 206 may be substantially disposed within the rotor housing 212. The shaft 206 may be driven longitudinally, for example, by a screw or the like activated by first motor 204. The shaft 206 may have a motor end connected to first motor 204 and a gripper end rigidly connected to a substantially perpendicular pivot rod 207. In some exemplary embodiments, pivot rod 207 may have a cone-shaped tip. The gripper assembly 203 may be configured to receive a transferable hanger 210 on pivot rod 207. Transferable hanger 210 may have a pair of oppositely moving fingers 208. Each finger 208 may include a protrusion 211 proximate a top portion. Transferable hanger may include a biasing element 209 between fingers 208, which may act to bias fingers 208 toward one another when at rest. In one exemplary embodiment, biasing element 209 may be a spring or the like, which may spring-loadingly bias fingers 208 toward one another when at rest. When at rest, fingers 208 may be configured to provide enough tension to grip, hold, or otherwise retain an object. For example, when in a resting position, fingers 208 may hold and retain a clothing item or the like, as would be understood by a person of ordinary skill in the art. As shown in FIG. 2, fingers 208 and biasing element 209 may form an inner diameter of transferable hanger 210 from which pivot rod 207 may be received within.

Shaft 206 may be moveable upon actuation of first motor 204. For example, upon actuation of first motor 204, shaft 206 may be configured to move in a direction toward the first motor 204. Movement of shaft 206 in this direction may further raise pivot rod 207 and transferable hanger 210 toward rotor housing 212. The protrusions 211 of each finger 208 may respectively engage curved surfaces 213 of rotor housing 212. The action of the protrusions 211 along the curved surfaces 213 of rotor housing 212 may act against biasing element 209, which may cause fingers 208 to move symmetrically away from each other, for example by pivoting about a central axis of biasing element 209. Conversely, linear movement of the shaft 206 in a direction away from first motor 204 may cause protrusions 213 to disengage curved surfaces 213, which may release tension on biasing element 209. Fingers 208 may move symmetrically toward each other and return to the resting position.

In another exemplary embodiment of gripper assembly 203, a second motor 214 may engage a gear 202 rigidly connected to rotor housing 212. When actuated, second motor 214 may engage gear 202, which may cause rotational movement of the rotor housing 212, shaft 206, pivot rod 207 and transferable hanger 210 about a rotor housing axis 216. Thus, transferable hanger 210 and any object retained between fingers 208 may be rotated as desired. In some exemplary embodiments, gripper assembly may be configured to transfer transferable hanger 210 to one or more hanger receivers 122 as next discussed.

FIG. 3A may show an exemplary hanger receiver 302. Hanger receiver 302 may be substantially similar to one of the plurality of hanger receivers 122 described with respect to FIG. 1. Hanger receiver 302 may include an elongated body 306. In some exemplary embodiments, hanger receiver 302 may be tubular. Alternatively, hanger receiver may have any desired shape as would be understood by a person of ordinary skill in the art. Elongated body 306 may have a first end 307 rigidly attached to a structure, for example an interior surface of wardrobe 100, and a second free end 305 that may include a flange 304. A projection 309 may extend beyond flange 304 and may form a channel 308.

A securing mechanism 310 may be coupled to an end of projection 309 opposite flange 304. Securing mechanism 310 may be shaped to have a concave inner surface. Securing mechanism 310 may be slightly offset in a downward direction with respect to projection 309 when in a resting position. Securing mechanism 310 may be translatable in a vertical direction with respect to projection 309. For example, securing mechanism 310 may be coupled to projection 309 by holding pins which may slide within pin slots. Alternatively, securing mechanism 310 may be coupled to projection 309 in any manner as would be understood by a person of ordinary skill in the art to achieve the intended functionality.

Figure 5A:
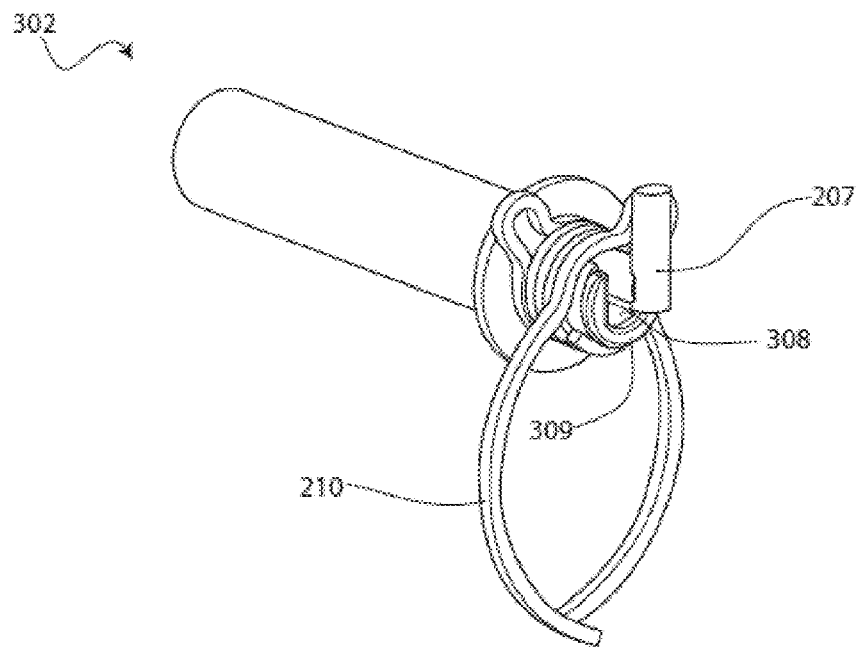
FIG. 5A may show a transferable hanger transferred between a gripper assembly and a hanger receiver.
Figure 5B:
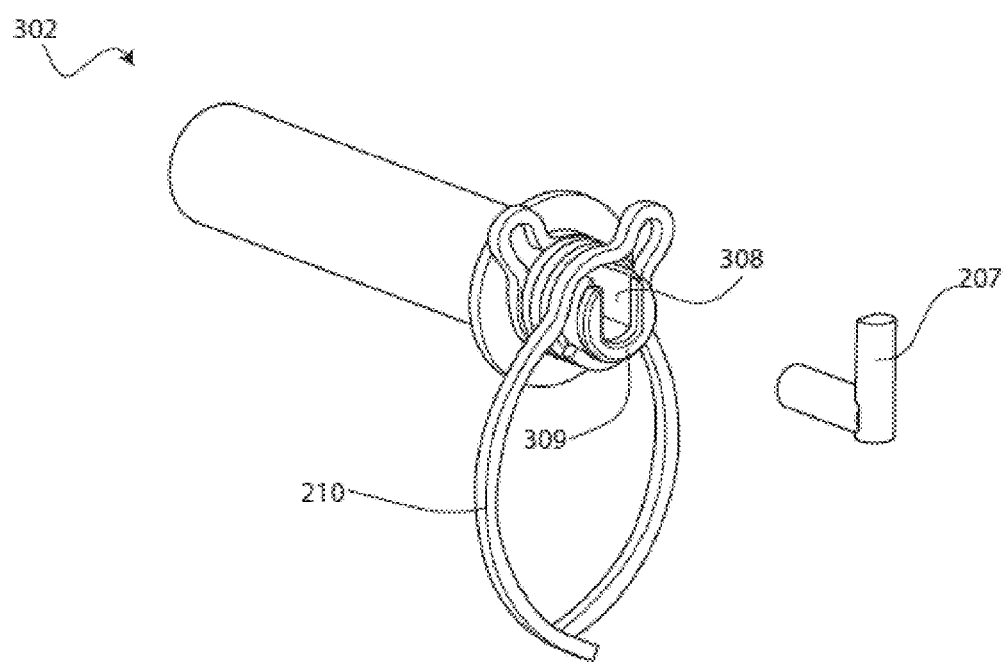
FIG. 5B may show another transferable hanger transferred between a gripper assembly and a hanger receiver.

FIGS. 5A and 5B may illustrate how transferable hanger 210 may be transferred from gripper assembly 203 to hanger receiver 302. In one exemplary embodiment, mounting platform 106 and linear actuator 108 may be controlled to bring pivot rod 207 of gripper assembly 203 proximate channel 308 of hanger receiver 302. In some exemplary embodiments, pivot rod 207 may be received within the channel 308. Pivot rod 207 may be positioned slightly above channel 308 at entry and the cone shaped tip of pivot rod 207 may first engage the concave inner surface of securing mechanism 310. This action may raise securing mechanism 310 as, for example, the pin slots slide up the pin such that securing mechanism 310 is substantially flush with projection 309. The inner diameter of the transferable hanger 210 may be received over an outer diameter of the projection 309. The pivot rod 207 of the gripper 203 may then be controlled to move slightly downward to disengage from the transferable hanger 210 and allow transferable hanger 210 to rest on projection 309. Pivot rod 207 may then be moved out of channel 308. Securing mechanism 310 may then return to its resting position offset from projection 309 which may prevent transferable hanger 210 from sliding off or otherwise disengaging projection 309. The reverse action may be performed for the pivot rod 207 to pick up the transferable hanger 210 from the hanger receiver 302.

Figure 4A:
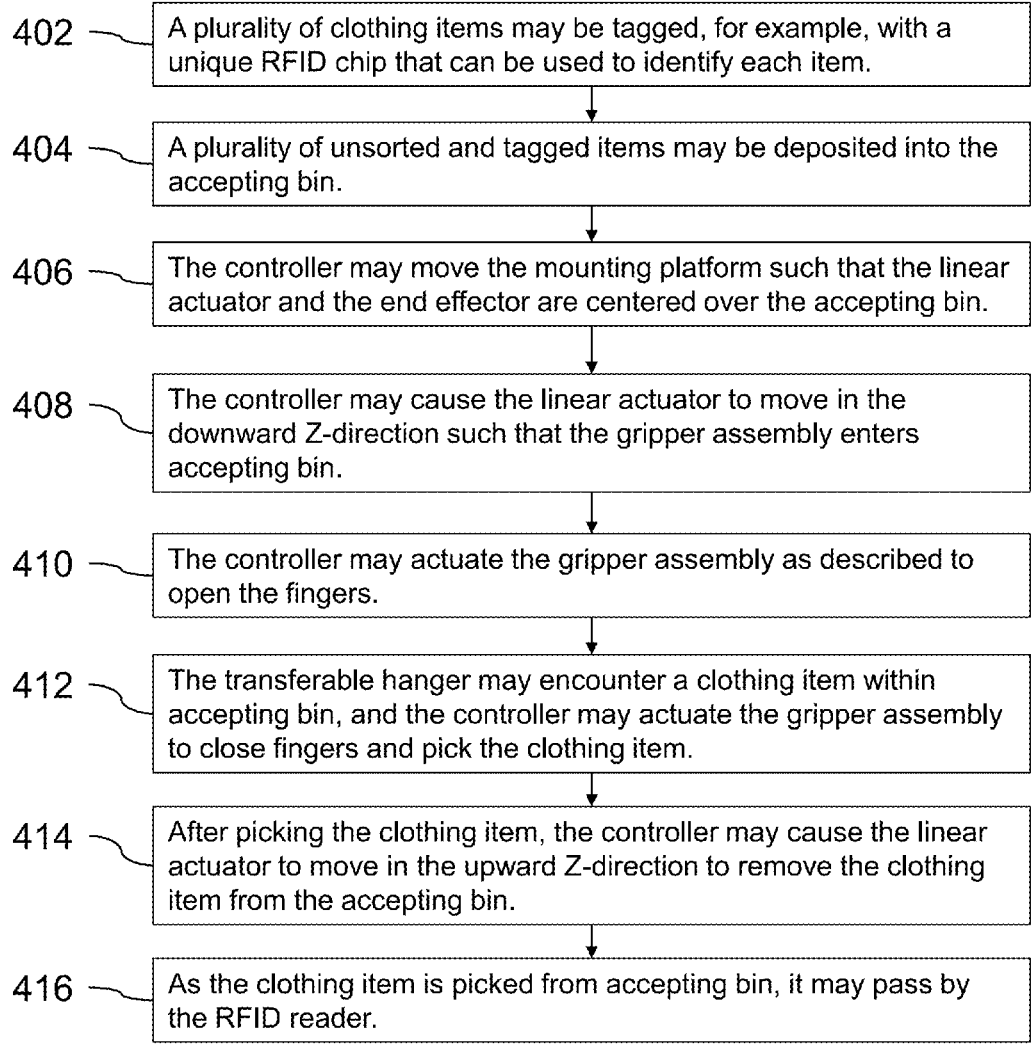
FIG. 4A may illustrate an exemplary method for depositing and storing objects in a wardrobe.
Figure 4B:
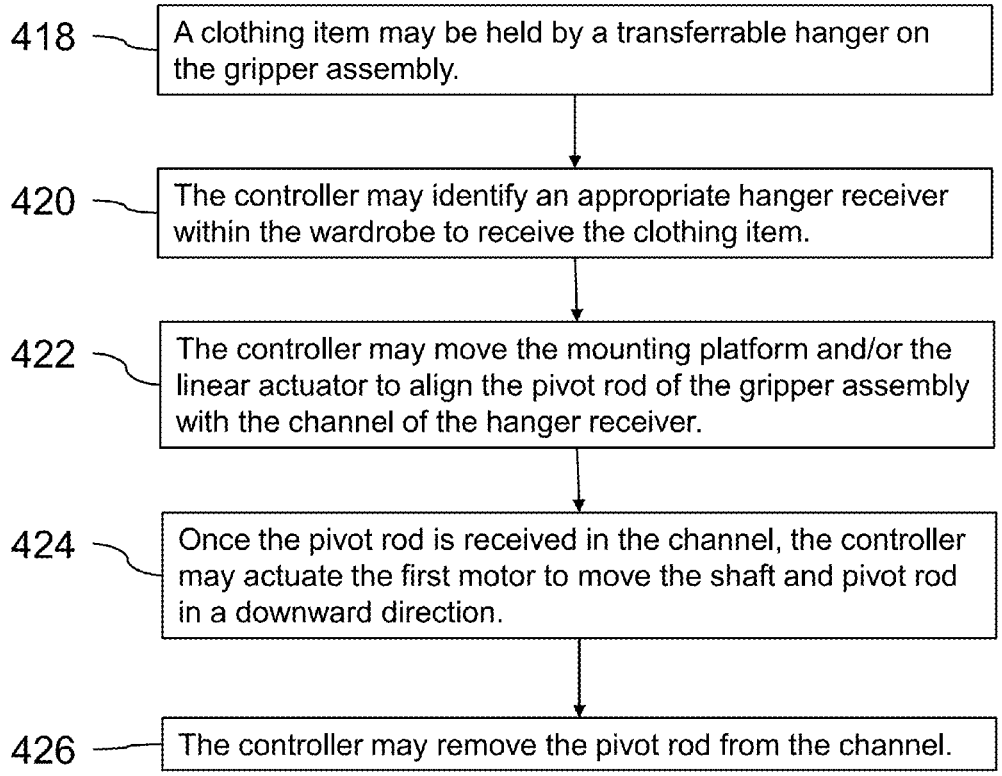
FIG. 4B may illustrate another exemplary method for depositing and storing objects in a wardrobe.

FIGS. 4A and 4B may show an exemplary method of depositing and storing objects within wardrobe 100. FIG. 4A may show the steps of depositing and picking clothing items for storage. At step 402, a plurality of clothing items may be tagged, for example, with a unique RFID chip that can be used to identify each item. At step 404, a plurality of unsorted and tagged items may be deposited into accepting bin 104. The wardrobe may be activated, for example, by selecting an appropriate command on display screen 120. Upon activation, at step 406, the controller 118 may move mounting platform 106 such that linear actuator 108 and end effector 116 are centered over the accepting bin 104. In this example, the end effector may be the gripper assembly 203 including transferable hanger 210. At step 408, the controller may cause linear actuator 108 to move in the downward Z-direction such that the gripper assembly 203 enters accepting bin 104. At step 410, controller 118 may actuate gripper assembly 203 as described to open fingers 208. At step 412, transferable hanger 210 may encounter a clothing item within accepting bin 104, and controller 118 may actuate gripper assembly 203 to close fingers 208 and pick the clothing item. The clothing item may be retained by transferable hanger 210 by the retaining force of biasing element 209 without power.

At step 414, after picking the clothing item, controller 118 may cause linear actuator 108 to move in the upward Z-direction to remove the clothing item from the accepting bin 104. At step 416, as the clothing item is picked from accepting bin 104, it may pass by RFID reader 105. Information from the RFID tag associated with the clothing item may be read by RFID reader 105 and stored, for example, by controller 118.

FIG. 4B may show the steps of transferring a clothing item from gripper assembly 203 to a hanger receiver 122 for storage. In this example, the hanger receiver 122 may be hanger receiver 302. At step 418, a clothing item may be held by transferable hanger 210 on gripper assembly 203. At step 420, controller 118 may identify an appropriate hanger receiver 302 within wardrobe 100 to receive the clothing item. At step 422, controller 118 may move mounting platform 106 and/or linear actuator 108 to align pivot rod 207 of gripper assembly 203 with the channel 308 of hanger receiver 302. At step 424, once pivot rod 207 is received in channel 308, controller 118 may actuate first motor 204 to move shaft 206 and pivot rod 207 in a downward direction. As further shown in FIGS. 5A-B this action may uncouple transferable hanger 210 from pivot rod 207, and transfer transferable hanger 210 onto protrusion 309 of hanger receiver 302. At step 426, controller 118 may remove pivot rod 207 from channel 308.

As would be understood by a person of ordinary skill in the art, steps 402-426 may be repeated as necessary to pick all clothing items from accepting bin 104 until all clothing items are held by a transferable hanger 210 and stored on an appropriate hanger receiver 302. Steps 402-426 may be completed in whole or in part, and in any order that achieves the objectives of the present invention. As would be understood by a person of ordinary skill in the art, there may be a number of different size hanger receivers 302 including, but not limited to, small for undergarments, medium for shirts and women's dress, skirts, and pants, and large for men's pants, shirts and sweatshirts, and the like. Alternatively, hanger receivers 302 may all be substantially similar. The layout, size and number of hanger receivers 302 may be designed to optimize space. The hanger receivers 302 of a particular size may optionally be grouped according to size in distinct locations. It may be appreciated that the hanger receivers 302 may be replaced by any desired structure such as boxes, bags, catches, hangers, folders, and drawers as would be understood by a person having ordinary skills in the art. In one exemplary embodiment small items, for example undergarments, socks, and the like, may not be stored by a transferable hanger 210 on a hanger receiver 302. Instead, these small items may be picked from accepting bin 104 by gripper assembly 203 and deposited into one or more drawers of wardrobe 100 which may be accessed from the exterior. The space for the hanger receivers 302 may be optimized for efficiency and for keeping the overall wardrobe 100 as small as possible.

Figure 6:
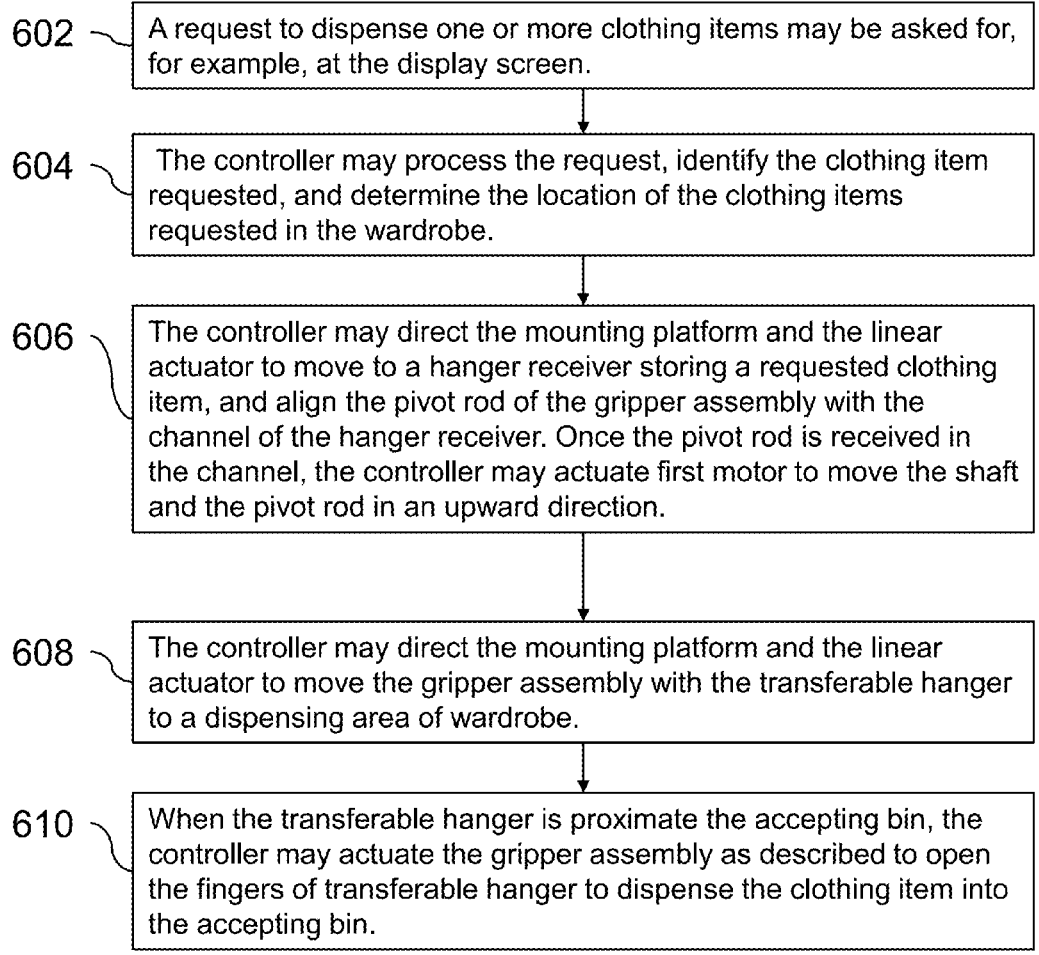
FIG. 6 may show an exemplary method for managing and dispensing objects within a wardrobe.

FIG. 6 may show an exemplary method of managing and dispensing objects within wardrobe 100. At step 602, a request to dispense one or more clothing items may be requested, for example, at display screen 120. At step 604 the controller may process the request, identify the one or more clothing items requested, and determine the location of the clothing items requested in wardrobe 100. For example, controller 118 may determine the position of one or more hanger receivers 302 associated with the requested item according to stored information. At step 606, the controller may direct mounting platform 106 and linear actuator 108 to move to a hanger receiver 302 storing a requested clothing item, and align pivot rod 207 of gripper assembly 203 with channel 308 of hanger receiver 302. At step 606, once pivot rod 207 is received in channel 308, controller 118 may actuate first motor 204 to move shaft 206 and pivot rod 207 in an upward direction. This action may uncouple transferable hanger 210 from protrusion 309, and transfer transferable hanger 210 which retains the requested clothing item onto pivot rod 207 of gripper assembly 203. At step 608, controller 118 may direct mounting platform 106 and linear actuator 108 to move gripper assembly 203 with the transferable hanger 210 to a dispensing area of wardrobe 100. In one exemplary embodiment, the dispensing area may be the accepting bin 104. At step 610, when the transferable hanger 210 is proximate accepting bin 104, controller 118 may actuate gripper assembly 203 as described to open fingers 208 of transferable hanger 210 to dispense the clothing item into accepting bin 104.

As would be understood by a person of ordinary skill in the art, steps 602-610 may be repeated as necessary to locate and dispense all requesting clothing items from wardrobe 100. In some exemplary embodiments, after dispensing one clothing item, the transferable hanger may be returned to an empty hanger receiver 302 before retrieving the next item. In alternative embodiments, one or more empty transferable hangers 210 may be stored in another location within the wardrobe as desired.

In an exemplary embodiment, the overall length of the wardrobe 100 may be approximately 66 inches, the height may be approximately 48 inches, and the width may be approximately 24 inches. Further, the wardrobe 100 may have a capacity of approximately two hundred clothing items for a standard adult, and approximately one hundred items for a child version. It may be appreciated that the wardrobe 100 may have any desired dimensions and capacity as may be understood by a person having ordinary skill in the art.

In another exemplary embodiment, the accepting bin 104 may be designed such that clothing items will not spill over any of its sides. The exterior shape of the accepting bin 104 may be substantially rectangular, but the inside may be shaped in a funnel-like or inverted pyramid shape. Further, the inner surface of the accepting bin 104 may be made of, or covered with, a smooth material that may allow the clothes to slide easily. The linear actuator 108 may be centered on the X-Y axis midpoint of the accepting bin 104. The clothing items may be picked and removed, one at a time, from the top. As clothing items may be removed, the items remaining in the accepting bin 104 may slide down to the lowest point in the center of the accepting bin 104.

In another exemplary embodiment, the wardrobe 100 may have automated doors located at the top of the accepting bin 104. The doors may open and allow the linear actuator 108 and end effector 116 to lower down into the accepting bin 104 to pick clothing items. In some exemplary embodiments the accepting bin may be controlled by controller 118 such that the opening in the accepting bin aligns with the automated doors.

In an exemplary embodiment, the area around the automated doors may have sensors 107 that may communicate with controller 118 to detect when end effector 116 and clothing items retained therein have cleared the automated doors. If the end effector 116 has reached the upper limit of its vertical travel distance in the Z-direction, a longer clothing item may not have cleared the accepting bin 104. In this instance, controller 118 may close the automated doors of the accepting bin 104, thus pinching the clothing item between the doors. In this exemplary situation, controller 118 may direct end effector 116 to release the clothing item, then lower and re-pick the clothing item, for example in a location that is more central to a mid-point of the clothing item. Controller 118 may then direct the doors to re-open, and the end effector 116 may continue with a second lift, to clear the clothing item from the accepting bin 104. The wardrobe 100 may repeat this operation as many times as needed. In a further embodiment, the end effector 116 may pass through a scraper, keyhole, or the like that may separate any other clothing items that may be clinging to the picked clothing item.

In another exemplary embodiment, the accepting bin 104 may be front loaded. In an alternative embodiment, accepting bin 104 may have a "tip" design with, for example, a hinge at the bottom, and a handle at the top. The accepting bin 104 may be manually operated by the user by pulling the handle at the top, and the accepting bin 104 may rotate outward from the top, effectively exposing the open accepting bin 104. The accepting bin 104 may also have a built-in stopper at the top that may prevent the accepting bin 104 from rotating out of the wardrobe 100. A built-in bumper and stopper combination may be located on the bottom, protecting the accepting bin 104 from slamming shut, and may further ensure that the accepting bin 104 is properly positioned when in a closed position.

In an exemplary embodiment, the optional built-in steamer 109 may have a clean water tank or water line hookups as well as an exhaust steam vent. In alternative embodiments, wardrobe 100 may include a condenser system to capture moisture from steamer 109 and not exhaust it outside wardrobe 100. The water tank may be similar to the one found, for example in European-style clothes condenser dryers, as may be understood by a person having ordinary skill in the art. The built-in steamer 109 may also have an indicator light that may tell the user to refill the tank. In further exemplary embodiments, the automated doors of accepting bin 104 may have a waterproof seal when closed, which may allow clothing items within accepting bin 104 to be steamed while keeping moisture out of the remainder of wardrobe 100. Accepting bin 104 may further have a moisture sensor which may detect a level of moisture of the clothing items therein. If the level of moisture is acceptable, then the clothing items may be picked for storage in wardrobe 100 as previously described. If the level of moisture is unacceptable (e.g. clothes in accepting bin 104 are too damp), a drying cycle of accepting bin 104 may be initiated. In another exemplary embodiment, an indication of high moisture level may be shown on display screen 120 so that steps may be taken to dry the clothes before picking. In another exemplary embodiment, the linear actuator 108 may use a moisture sensor to determine if any clothing item may still be wet. A wet item may be placed back into the accepting bin 104 or any desired location, and an appropriate message may be displayed on display screen 120.

In some exemplary embodiments, wardrobe 100 may be programmed to dispense clothing items in advance, which may require a time keeping device. Wardrobe 100 may keep an updated clock and calendar, and may store any commands that need to be executed at a future time. Wardrobe 100 may be connected to a power supply. Additionally, the wardrobe 100 may also be equipped with a battery so that wardrobe 100 is fully operational even in the event of a power outage.

Figure 7:
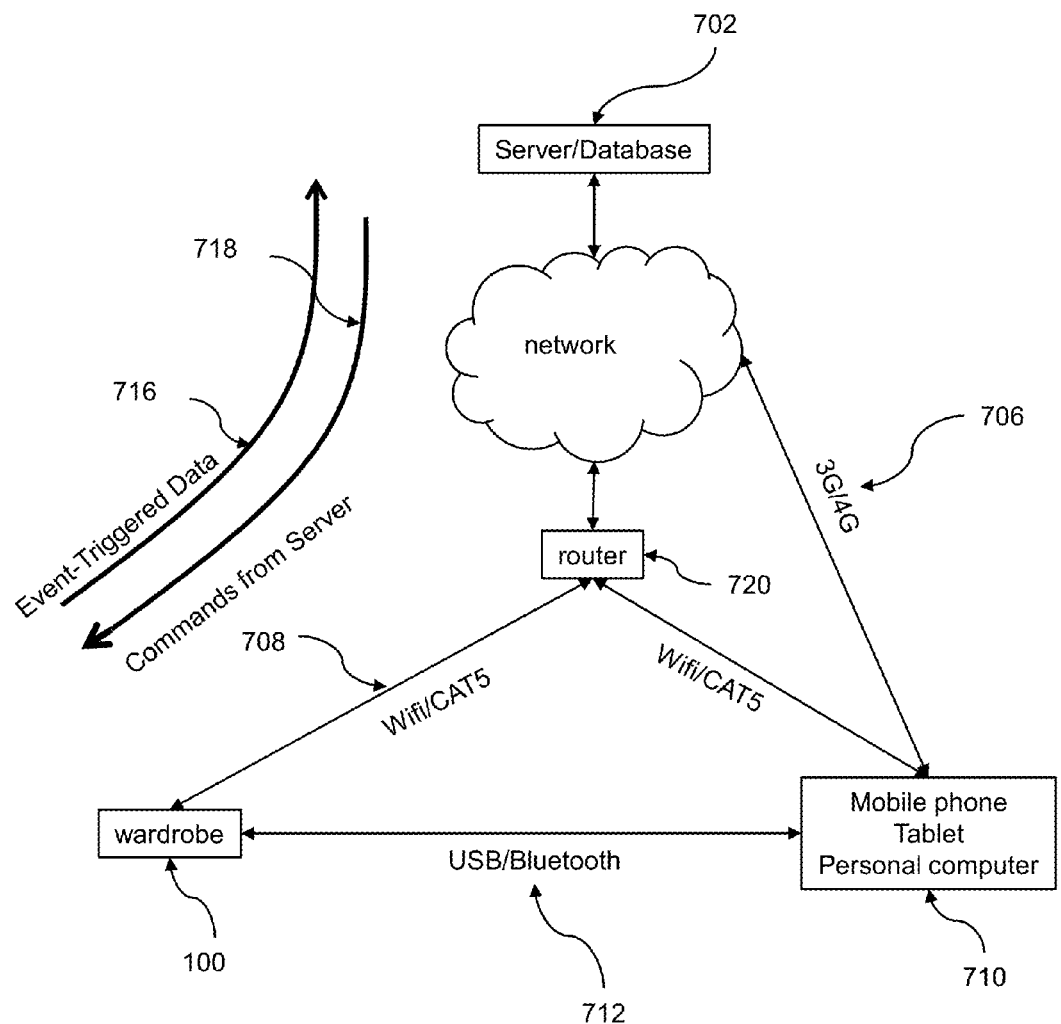
FIG. 7 may show an exemplary embodiment of a network design included in a system, apparatus, and method of handling, storing and managing garments.

According to an exemplary embodiment illustrated in FIG. 7, the wardrobe 100 may include a controller 118 hosted firmware that may control all functions of the wardrobe 100. Controller 118 may have a storage unit that may keep a database of all clothing items stored in wardrobe 100, the associated characteristics of those items, and their history of use (loading and dispensing. Further, controller 118 may allow the users to interact with the display screen 120 on the wardrobe 100, for example, for selecting clothes and outfits for dispensing, uploading clothing information, and the like. The wardrobe 100 may be equipped with internet connectivity 708 such as home wired or wireless internet and router 720. Wardrobe 100 may further be equipped with a wireless technology standard for exchanging data such as mobile network 706. Connectivity such as USB and BLUETOOTH 712 may also be used if, for example, wireless internet or router 720 fails. If the wardrobe is connected to the internet, all data stored/generated by the wardrobe can be uploaded to a web server/database 702. In another embodiment, where the wardrobe is always connected to the internet, all data storage and management could be managed by the web server/database 702.

In an exemplary embodiment, when powered-on, the wardrobe 100, may connect to a wired or wireless technology standard for exchanging data such as BLUETOOTH 712 or wireless internet as would be understood by a person having ordinary skill in the art. A user may connect to the wardrobe 100 for the first time, using an application software, for example, on a personal computing device 710 or the display screen 120 embedded in the wardrobe 100. The application software may be hosted on a number of supports including, but not limited to, the wardrobe 100 embedded display screen 120, a personal computing device 710, a web server/database 702 or the like. The personal computing device 710 and web or mobile application may connect to the wardrobe 100 via BLUETOOTH 712, wireless internet or other means that would be understood by a person having ordinary skill in the art. An installation software tool may allow the user to configure the wardrobe 100, and load details about each clothing item being stored therein. For example, configuration data and clothing characteristics may be stored by wardrobe 100. The user may also create a user account in web server/database 702 which may be a cloud database. The wardrobe 100 may link to a specific cloud user account, and may upload the data to a web server, for example when connecting to the web server for the first time. In other exemplary embodiments, wardrobe 100 may upload data anytime it connects to the web server, or may stay continuously connected to the web server, to upload information as would be understood by a person of ordinary skill in the art.

In another embodiment, the embedded display screen 120 and mobile application may also have a wardrobe "set-up" feature, which may allow the user to configure a number of basic settings. These settings may include, but not be limited to, assigning the wardrobe 100 an alphanumeric name, creating an optional password, turning the wireless and BLUETOOTH 712 connections on or off, and assigning the user's "Web Account" and IP address. It may be appreciated that the user may protect access to the wardrobe 100 and to stored data with any desired security measures such as passwords, encryption, and the like as may be understood by a person having ordinary skill in the art. In further exemplary embodiments, wardrobe 100 may have multiple users, and may be configured to create multiple user profiles or accounts.

Wardrobe 100 may push data 716 to web server/database 702, and may be polled from the cloud with time event triggers for data transfers 718. In an exemplary embodiment, the primary user interfaces may be the display screen 120. In alternative embodiments, a personal computing device 710, including, but not be limited to, mobile phones, tablets, personal computers, or the like, may be configured to interface with wardrobe 100. Further, the web server may push commands, instructions, and software updates, and store essential data in a memory of wardrobe 100.

It may be appreciated that controller 118 may have adequate processor capability and database storage to host the operating system/firmware, wardrobe configuration details, and characteristics of the clothing items stored in the wardrobe 100. The controller 118 may also send reports to, and receive commands from, the web server/database 702, record future dispensing dates and times, and recommend a steam cycle based on fabric types, and the like. Further, the controller-hosted operating system may control all functions of the wardrobe 100 including, but not limited to, detecting the status of all doors, buttons, and switches, and controlling mounting platform 106, linear actuator 108, and end effector 116. The operating system may also be connected to RFID reader 105 to identify clothing items, match them within the wardrobe's storage/computing means, and assign to an available hanger receiver 122.

In an exemplary embodiment, a start button may be located on the outside of the wardrobe 100. The operating system may identify when the start button may be pushed, and may check that that accepting bin 104 is in the closed position before the linear actuator 108 may begin the overall picking process. Once the picking process starts, the operating system may show a message on the wardrobe 100 that may display, for example, the word: "Separating". The linear actuator 108 may also know when to start and stop for each pick by activation of end effector 116. This may be integrated into the travel distance of the linear actuator 108 and end effector 116, as upper and lower vertical limits may be defined.

In another exemplary embodiment, the identification process of a clothing item may be provided. As part of the wardrobe installation process, characteristics of each clothing items may be entered into the wardrobe 100 (and optionally, in web server/database 702). An RFID tag may be attached to each clothing items, and the corresponding identification number may be registered in wardrobe 100 and web server/database 702. When clothing items may be picked out of the accepting bin 104, the RFID reader 105 may read the RFID tag attached to the clothing item. In some exemplary embodiments, the RFID reader 105 may be activated when the linear actuator 108 is activated.

In an exemplary embodiment, the RFID reader 105 may report the ID of the clothing item to the operating system on controller 118. The operating system may identify an open hanger receiver 122, of the appropriate size, in wardrobe 100. For example, the operating system may know what size hanger receiver 122 may be required for each identification number. This entry may also be done in the web server/database 702, and may be communicated to the wardrobe 100 for storage.

In an exemplary embodiment, in the event of a misread RFID number, the linear actuator 108 may attempt to lower and raise the clothing item again near the RFID reader 105 until the item may be identified. Alternatively, the linear actuator 108 may put the clothing item into a holding area, or may release the item back into the accepting bin 104 and proceed to pick another item. Once accepting bin 104 is unloaded, the linear actuator 108 may move the holding area items back into accepting bin 104. Wardrobe 100 may then display an error message on the display screen 120, which may indicate an unidentified item.

In an exemplary embodiment, the process may call for wardrobe 100 to separate and store each clothing item individually. The display screen 120 may show an appropriate status message throughout the process of storing a plurality of clothing items. When clothing items come in pairs (socks, for example), the linear actuator 108 may pick both halves of the pair separately. The operating system may identify that the items may be part of a pair, and may direct the end effector 116 to deliver the second item into a particular location. If the second item is missing, a warning may be displayed.

In an exemplary embodiment, the operating system may record a hanger receiver number for each stored clothing item by referencing the clothing items by their RFID number. This information may be later used for the retrieval process. The wardrobe 100 may send an updated inventory report to the web server/database 702, and the wardrobe 100 may report the RFID numbers of all clothing items that were stored. Consequently, the user may see the inventory available in the wardrobe 100 via display screen 120, and may retrieve any desired item, outfits or the like. Alternatively, a user may see the inventory available via a remote server on a personal computing or mobile device as would be understood by a person of ordinary skill in the art.

In some exemplary embodiments, wardrobe 100 may have an embedded camera, flash, and elements of a photo/light booth as would be understood by a person of ordinary skill in the art. The user may manually operate these systems to capture and store a photo of each clothing item. Display screen 120 may use this picture in association with each item and/or accessory added to the web server/database 702. The embedded photo system may create a controlled, consistent environment for taking photos, which may result with uniformity of clothing item pictures, and with color identification of each clothing item.

In an exemplary embodiment, the speed of the mounting platform 106, linear actuator 108 and end effector 116 may be adapted as desired for the retrieval process. The user may select a number of clothing items to be retrieved from storage via the display screen 120 on the wardrobe 100 or on a separate personal computing device 710. The RFID of the selected clothing items may be read by the wardrobe 100. Further, the user may select a date and time that wardrobe 100 may start retrieving the clothing items. Alternatively, the user may enter the specific time that they want the items to be dispensed. Wardrobe 100 may calculate when to start the retrieval process. The operating system and web server/database 702 may store the information if the dispensing is scheduled at a future date or time. If an item is missing, the operating system may display a warning message on display screen 120, and may prompt the user to change his or her selection.

During the retrieving process, the operating system may display a "Retrieving" status message on display screen 120 to signal to the user that the clothes are being retrieved from storage. The operating system may identify the location of the selected number of clothing items, and may direct the mounting platform 106, linear actuator 108, and end effector 116 to move to the appropriate location. If multiple items are to be retrieved, the operating system may provide a sequence in which the items should be retrieved.

In a further exemplary embodiment, accepting bin 104 may have an electro-mechanical switch, or the like, to indicate to the operating system that the accepting bin 104 is open or closed. In the event that accepting bin 104 is open when the start button on wardrobe 100 is activated, the operating system may show a warning message on display screen 120.

In another exemplary embodiment, the steamer 109 may be opened by a mechanical device. The operating system may identify when the steamer door may be opened. The operating system may direct the mounting platform 106, linear actuator 108, and end effector 116 to start and run for a fixed time loading the clothing items into steamer 109. The retrieval process may continue until all selected clothing items are placed into the steamer 109. The operating system may know when the final clothing item is delivered to the steamer 109, and may then direct a door of steamer 109 to close and seal. The operating system may determine the correct steam cycle to use, according to, for example, information associated with the RFID number of the item stored by controller 118 or the web server/database 702. The steam cycle may optionally be chosen directly by the user. The user may manually remove the clothing items from the steamer 109 via an external door. The external door of the steamer 109 may have a switch to indicate the status of the steamer 109. Alternatively, display screen 120 may also show a number of warning or status messages.

In an exemplary embodiment, wardrobe 100 may be connected to an application accessible by display screen 120 and/or by any desired personal computing device. The application may perform a number of tasks including, but not limited to, collecting the user's personal information, defining match filters, and entering new clothing items in controller 118 and/or web server/database 702 with any desired information. Further, the application may log external accessories, for example: shoes, belts, ties, and hats, although the external accessories may not be physically stored in the wardrobe 100. The application may learn the user's actual selection patterns and may run a habit analysis program that may be used to predict and recommend specific outfits as part of an assisted closet search functionality. For example, the application may provide advice for selecting clothes appropriate for a number of circumstances such as a party, an extended trip, work, formal event, or other occasion. In an exemplary embodiment, software driven triggers may prompt the user to take actions such as approving a selected outfit for a given occasion.

Figure 8:
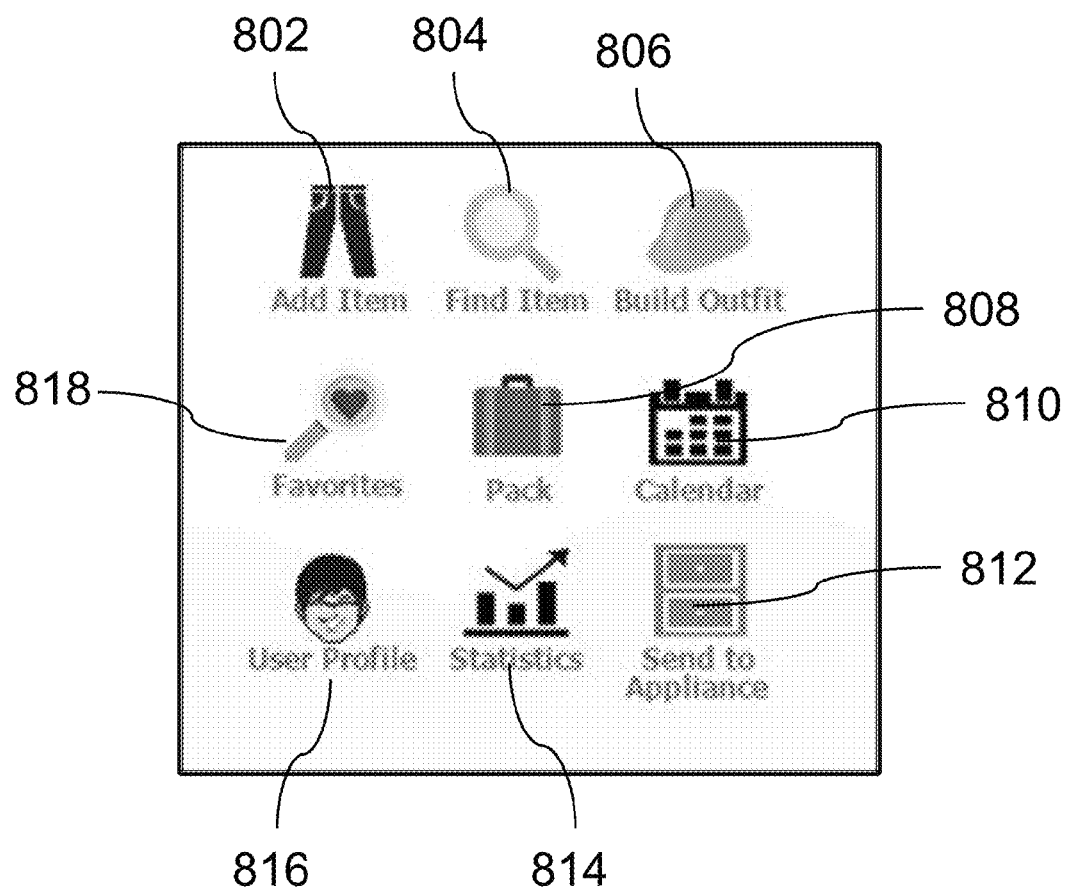
FIG. 8 may show an exemplary embodiment of user interface for an application included in a system, apparatus, and method of handling, storing and managing garments.

An exemplary embodiment of an application interface may be illustrated in FIG. 8. The application interface may be shown on display screen 120. In alternative embodiments, application interface may be displayed on a personal computing or mobile device as would be understood by a person of ordinary skill in the art. The application interface may have a number of icons including, but not limited to, add item 802, find item 804, build outfit 806, pack 808, calendar 810, send to appliance 812, statistics 814, and user profile 816, and favorites 818. There may be a minimal number of buttons, and indicators on the exterior of wardrobe 100. The interface may include, but not be limited to; power on/off button, start button, and status display. Display screen 120 may be in an alternative color, such as red, if wardrobe 100 requires immediate attention. Display screen 120 may also be used to select, dispense, and upload items and may match the web or mobile based versions.

Figure 9:
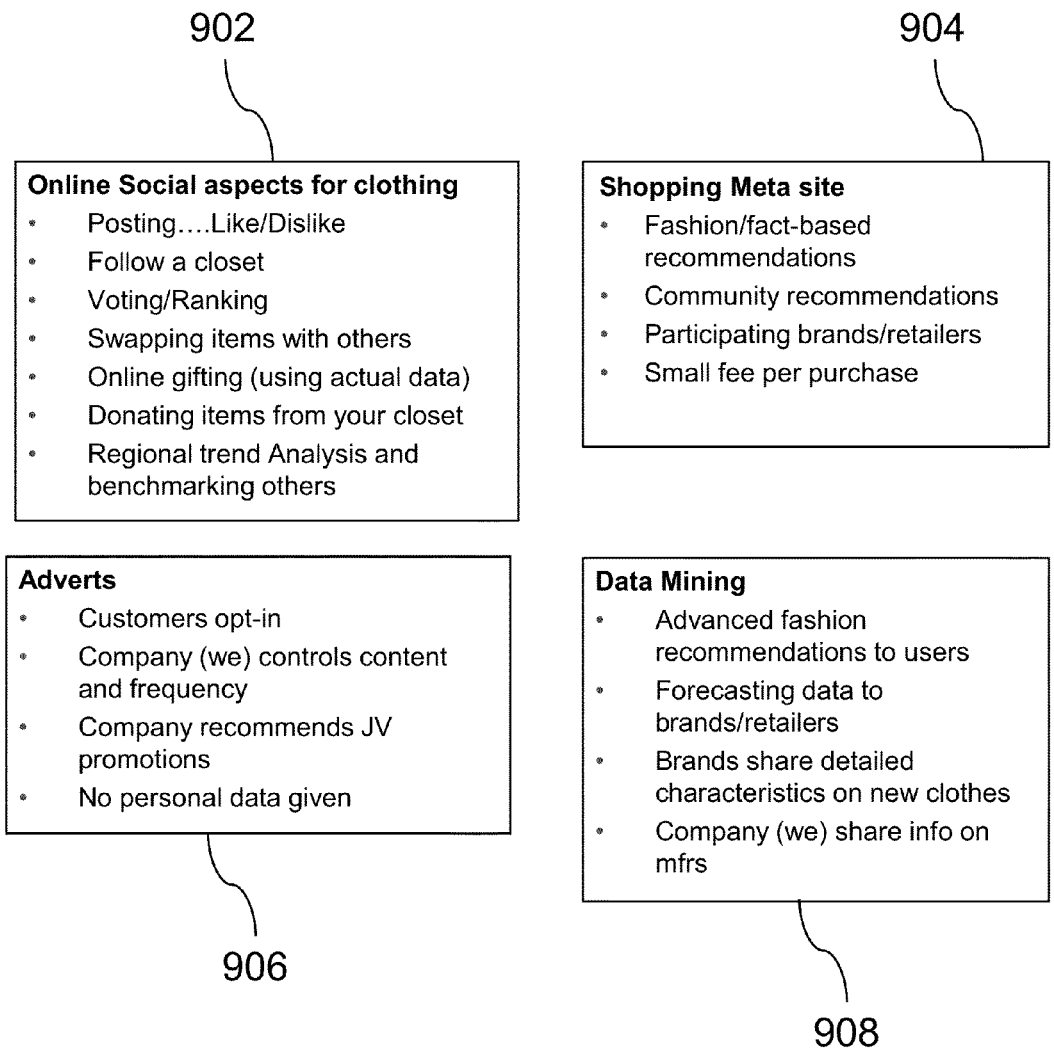
FIG. 9 may show an exemplary embodiment of functionalities related to an application included in a system, apparatus, and method of handling, storing and managing garments.

FIG. 9 may illustrate another exemplary embodiment where users may share the content of their closet on social media. Users may sign up and log on a dedicated website, optionally linked to the application, and may create an online community. Members of the community may communicate and interact with each other in a number of ways. For example, users may like, dislike, and vote on clothing items, outfits, and closets. Users may also follow specific closets, swap items with other users, give items, and donate unwanted items 902. The website may create an ecosystem that may attract and retain users, retailers, and manufacturers. In a further embodiment, key fashion experts may be recruited for their expert content and ideas, and application developers may be encouraged to build applications around the community data.

In an exemplary embodiment, the web server/database 702 may store and analyze individual and collective data that may be gathered from wardrobe 100. Geo-localization and geo-fencing of wardrobe 100 may correlate the data to the user's location and specific regions. Data generated may be mined by individual and community data to assist users with fashion advice and to assist apparel brands and retailers with fact-based forecasting, targeted advertisements, partnerships, promotional synergies, user profiling, or the like. Further, the data may be used to create meta sites for apparel e-commerce 904.

In another embodiment illustrated in FIG. 9, data that may be generated by wardrobe 100 may be made available to a shopping meta site 904 that may offer a number of services, including but not limited to, fashion and fact-based recommendations, community recommendations, input from participating brands and retailers, and fees per purchase. In an exemplary embodiment, a number of advertising opportunities 906 may be provided, such as customer opt-in, pay per view ("PPV") or pay per click ("PPC"), and join venture ("JV") promotions. In a further exemplary embodiment, wardrobe 100 may provide apparel brands and retailers the benefits of data analysis on consumer's clothing usage for improving their fashion design, manufacturing, and regional distribution planning 908.

Figure 10:
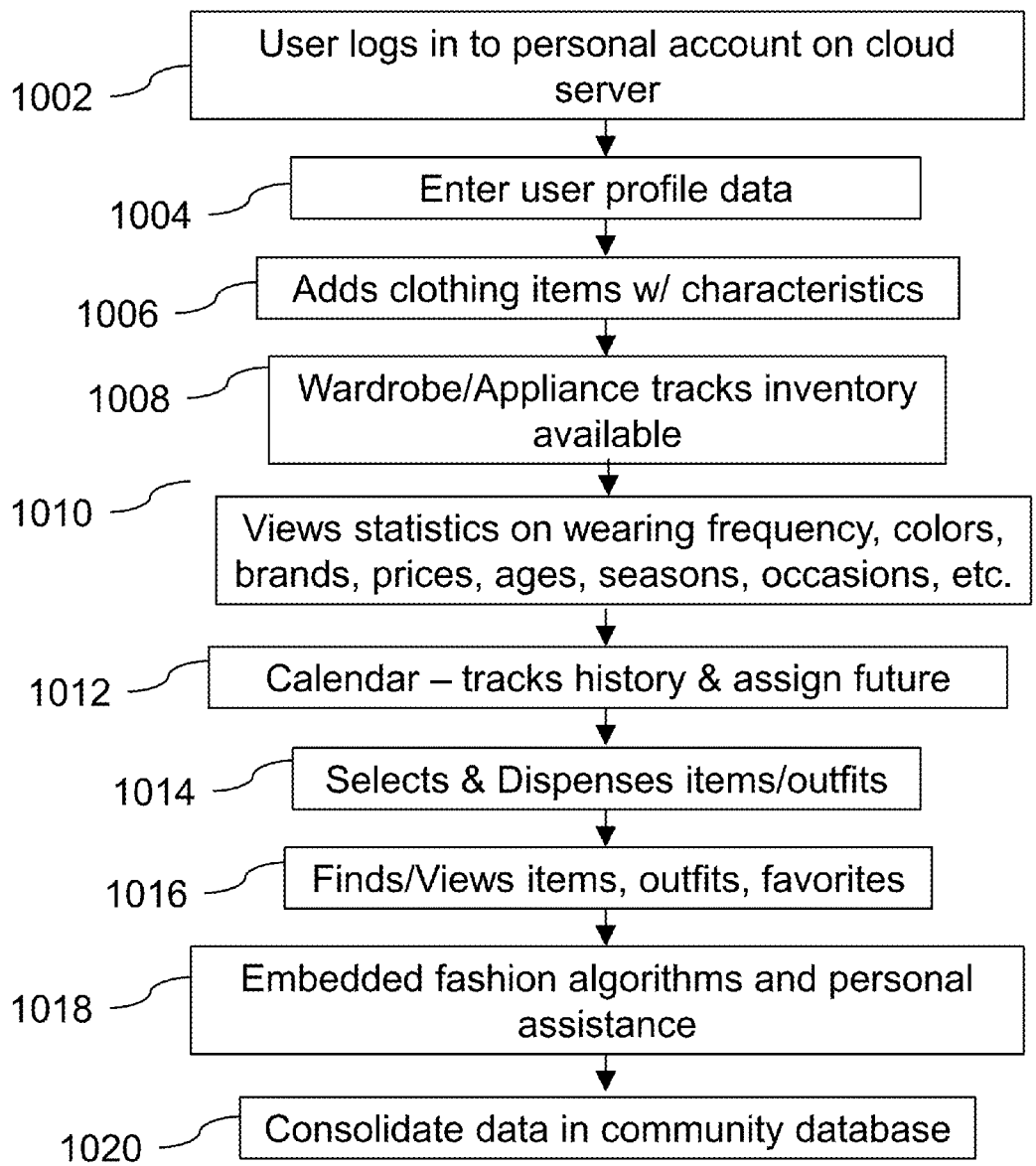
FIG. 10 may show an exemplary embodiment of a method of handling, storing and managing garments.

FIG. 10 may illustrate an exemplary embodiment of a method for managing and sharing a collection of clothing items. A user may first log into a personal account on a server 1002 and enter user profile data 1004 before adding clothing items with characteristics 1006. The appliance or wardrobe may track the inventory available 1008 and the user may have access to a number of statistics related to the clothing items 1010. A calendar may be set up 1012 and the wardrobe may dispense the selected outfit 1014, 1016. The web server/database 702 and operating system may have a number of algorithms 1018 to assist the user with purchases and may consolidate the data as part of a community database 1020.

The foregoing description and accompanying Figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A wardrobe comprising:
a housing;
a receiving element located in the housing and configured to receive and dispense clothing items, each clothing item including a unique RFID tag;
at least one RFID reader connected to a computing means configured to obtain information held in each RFID tag;
a mounting platform proximate a top surface of the housing, the mounting platform controlled by the computing means;
a linear actuator coupled to the mounting platform, the linear actuator controlled by the computing means;
a gripper assembly coupled to an end of the linear actuator;
a plurality of hanger receivers disposed on one or more inner surfaces of the housing;
at least one transferable hanger configured to store one or more of the clothing items, the at least one transferable hanger further configured to be transferred between the gripper assembly and one or more of the plurality of hanger receivers;
a display screen embedded on an outer surface of the housing and connected to the computing means; and
an information storage device connected to the computing means.

2. The wardrobe of claim 1, wherein the computing means is configured to cause the mounting platform, linear actuator, and gripper assembly to transport a clothing item retained by the at least one transferable hanger from the receiving element to a storage position on one of the plurality of hanger receivers by using the information obtained by the RFID reader.

3. The wardrobe of claim 2, wherein the storage position for each clothing item is predetermined.

4. The wardrobe of claim 1, wherein the mounting platform, linear actuator, and gripper assembly are disposed above or lateral to the receiving element.

5. The wardrobe of claim 1, wherein the at least one transferable hanger is configured to grasp a single clothing item.

6. The wardrobe of claim 1, wherein the receiving element is configured to steam the clothing items prior to storing or dispensing.

7. The wardrobe of claim 1, wherein information held by each RFID tag is stored by the computing means.

8. The wardrobe of claim 1, wherein the display screen is an interface configured to control the computing means.

9. The wardrobe of claim 1, wherein the receiving element includes automated doors controlled by the computing means.

10. The wardrobe of claim further comprising:
a plurality of sensors within the receiving element configured to detect information from one or more of RFID tags.

11. The wardrobe of claim 1, further comprising:
at least one moisture sensor within the receiving element.

12. The wardrobe of claim 1, further comprising:
an embedded camera on an exterior of the housing.

* * * * *